United States Patent
Amin et al.

(10) Patent No.: US 12,027,664 B2
(45) Date of Patent: Jul. 2, 2024

(54) NASICON DUAL ION CONDUCTORS FOR ALL SOLID-STATE BATTERIES

(71) Applicant: UT-Battelle, LLC, Oak Ridge, TN (US)

(72) Inventors: Ruhul Amin, Oak Ridge, TN (US); Rachid Essehli, Oak Ridge, TN (US); Ilias Belharouak, Oak Ridge, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 279 days.

(21) Appl. No.: 17/325,484

(22) Filed: May 20, 2021

(65) Prior Publication Data

US 2021/0367267 A1    Nov. 25, 2021

Related U.S. Application Data

(60) Provisional application No. 63/027,477, filed on May 20, 2020.

(51) Int. Cl.
*H01M 10/0562*    (2010.01)

(52) U.S. Cl.
CPC .......... *H01M 10/0562* (2013.01); *H01M 2300/0077* (2013.01)

(58) Field of Classification Search
CPC .......... H01M 10/052; H01M 10/0562; H01M 10/0525; H01M 10/054; H01M 2300/0068; H01M 2300/0077; H01M 2300/0065–0082; H01M 10/0585; H01M 4/62; H01M 4/485; H01M 4/58; H01M 4/582; H01M 4/5825; Y02E 60/10; Y02E 60/50; C01P 2006/40; C01B 25/45; Y02P 70/50; Y02T 10/70; H01G 11/02; H01G 11/30; H01G 11/56; H01G 11/86; C01G 25/006
See application file for complete search history.

(56) References Cited

U.S. PATENT DOCUMENTS

2017/0005327 A1* 1/2017 Goodenough ........ H01M 4/525
2020/0308000 A1* 10/2020 Ceder ................. H01M 4/5825

OTHER PUBLICATIONS

Gao et al., "Na3MnZr(PO4)3: A High-Voltage Cathode for Sodium Batteries," J. Am. Chem. Soc. 2018, 140, 51, p. 18192-18199. ( Year: 2018).*
Pan et al., "Room-temperature stationary sodium-ion batteries for large-scale electric energy storage," Energy Environ. Sci., 2013, 6 , p. 2338-2360. (Year: 2013).*
Viala et al., "Crystal Chemistry and Ionic Conductivity of a New NASICON-Related Solid Solution Na1+xZr2-x/2Mgx/2(PO4)3" Solid State Ionics 21, 1986, p. 333-337. (Year: 1986).*
Walczak et al., "Exploring the Role of Manganese on Structural, Transport, and Electrochemical Properties of NASICON-Na3Fe2-yMny(PO4)3 Cathode Materials for Na-Ion Batteries," ACS Applied Materials and Interfaces, 2019, 11, p. 43046-43055. (Year: 2019).*
Meier et al., "Preparation and Processing Temperature Effects on Ion Conductivity in Solution Derived Sodium Zirconium Phosphate (NaZr2P3O12) Thin Films," Journal of The Electrochemical Society, 161 (3) A364-A367 (2014) (Year: 2014).*
Chinnappan et al., "Theoretical study of high-pressure phase stability of NaZr2(PO4)3 via elastic constants and equation of state," Indian J Phys (Mar. 2017) 91(3): p. 277-286 (Year: 2017).*

* cited by examiner

*Primary Examiner* — Allison Bourke
*Assistant Examiner* — Bethany C Garcia
(74) *Attorney, Agent, or Firm* — WARNER NORCROSS + JUDD LLP

(57) ABSTRACT

A super ion conductor composition is disclosed. The super ion conductor composition has the general formula: $A_{1+x}M_{x/2}Zr_{2-x/2}(PO_4)_3$, where each A is independently Na or Li, M is Mn or Mg, and subscript x is from 0.5 to 3. A solid electrolyte comprising the super ion conductor composition, and a method of preparing the solid electrolyte, are also disclosed. The method comprises combining a zirconium compound, a manganese or magnesium compound, a sodium compound, and a phosphate compound to give a mixture; and calcining the mixture to give the super ion conductor composition, thereby preparing the solid electrolyte. Functional materials and devices comprising the super ion conductor composition are also disclosed, including a catholyte composition, an ion conducting solid electrolyte membrane, as well as all-solid-state batteries.

16 Claims, No Drawings

NASICON DUAL ION CONDUCTORS FOR ALL SOLID-STATE BATTERIES

CROSS-REFERENCE TO RELATED APPLICATIONS

This application claims the benefit of U.S. Provisional Application 63/027,477, filed May 20, 2020, the content of which is hereby incorporated by reference in its entirety.

STATEMENT REGARDING FEDERALLY SPONSORED RESEARCH AND DEVELOPMENT

The invention described in this disclosure was made with government support under Prime Contract No. DE-AC05-00OR22725 awarded by the U.S. Department of Energy (DOE). The U.S. government has certain rights in the invention.

FIELD OF THE DISCLOSURE

The present disclosure relates generally to conductive materials and, more specifically, to multi-ion super ionic conductor materials and methods of making and using the same.

BACKGROUND OF THE DISCLOSURE

All-solid-state batteries have attracted great attention in recent years due to the promise of realizing high-energy densities enabled through high-capacity metal anodes. Despite this promise, however, conventional all-solid-state batteries have a long way to go before successful commercialization can be achieved, owing to material and engineering challenges that have yet to be addressed for various components.

In recent times, research into solid electrolyte materials has evolved around the following metrics: (i) high ionic conductivity, (ii) chemical and electrochemical stability, (iii) mechanical robustness, and (iv) safety. While a plethora of solid electrolyte classes have been explored, the sodium supertonic conductor class (i.e., "NASICONs") has slowly being re-examined for examples with high ionic conductivities, mechanical robustness, and good chemical and electrochemical stabilities. In particular, materials belonging to the NASICON family utilizing phosphate anions have been extensively explored as potential electrolytes and cathode materials for Li, Na, and Mg-ion batteries, owing to their high ionic conductivity and thermal and environmental stability. The general formula for such NASICON type materials is $AM^1M^2(PO_4)_3$, where A can be a monovalent cation such as $Li^+$, $Na^+$, $K^+$, $Rb^+$, $Cs^+$, $Ag^+$, $Cu^+$, $H^+$, $H_3O^+$, $NH_4^+$, a divalent cation such as $Mg^{2+}$, $Ca^{2+}$, $Sr^{2+}$, $Ba^{2+}$, $Pb^{2+}$, $Cd^{2+}$, $Zn^{2+}$, $Mn^{2+}$, $Fe^{2+}$, $Co^{2+}$, $Ni^{2+}$ or $Cu^{2+}$, or, alternatively, simply representative of a vacant site. $M^1$ and $M^2$ can be filled with di-, tri-, tetra- or pentavalent transition metal ions within the boundaries of charge balance. NASICONs can crystallize in three different crystal structures, based on a particular selection of synthesis method, annealing temperature, and choice of A, $M^1$ and $M^2$, resulting in α, β and γ-NASICONs. Of these, γ-NASICONs have the highest symmetry with R3C space group, which is believed suitable for achieving high ionic conductivities.

NASICONs have been widely investigated for not only Na ion but also Li-ion all-solid state batteries. For example, $Li_{1.3}Al_{0.3}Ti_{1.7}(PO_4)_3$ (LATP) and $Li_{1.5}Al_{0.5}Ge_{1.5}(PO_4)_3$ (LAGP) are two popular NASICON electrolytes for Li-ion solid-state batteries. These electrolytes have high ionic conductivities (~$10^{-3}$ S cm$^{-1}$), but unfortunately suffer from stability issues as $Ti^{4+}$ and $Ge^{4+}$ undergo reduction in contact with Li metal anodes. First-principle studies on LATP and LAGP materials report operating voltage windows between 2.17-4.21 and 2.7-4.21 V, respectively. There are wide variety of Na-ion based NASICON materials available in the rhombohedral structure, which provide comparable ionic conductivities up to ~$10^{-3}$ S cm$^{-1}$ at room temperature because of 3D ion conducting pathways. Moreover, the abundance of Na source and low-cost processing makes Na-ion NASICON favorable compared to LATP and LAGP, which demand very high annealing and processing temperatures thereby increasing manufacturing cost. However, electrochemical and chemical cathode/electrolyte interface stability is also a challenge in these systems. As such, new material designs need to be envisioned and implemented in order to realize the utility of all-solid-state batteries with NASICON-type materials.

SUMMARY OF THE DISCLOSURE

A super ion conductor composition is provided. The super ion conductor composition has the general formula:

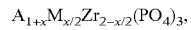
$A_{1+x}M_{x/2}Zr_{2-x/2}(PO_4)_3$, wherein each A is independently Na or Li, M is Mn or Mg, and subscript x is from 0.5 to 3.

A solid electrolyte comprising the super ion conductor composition is also provided, along with a solid state battery comprising the same.

A method of preparing the solid electrolyte is further provided, and comprises combining a zirconium compound, a manganese compound or magnesium compound, a sodium compound, and a phosphate compound to give a mixture; and calcining the mixture to give the super ion conductor composition, thereby preparing the solid electrolyte. In some embodiments, the compounds are combined in the presence of a carrier (e.g. a solvent) to give the mixture, and the method further comprises removing the carrier from the mixture before calcining. In certain embodiments, the super ion conductor composition is further defined as a dual-Li/Na ion conductor comprising a rhombohedral lattice structure and mobile $Na^+$ and $Li^+$ ions, calcining the mixture prepares a NASICON-type phase comprising the mobile $Na^+$ ions, and the method further comprises substituting the mobile $Na^+$ ions for $Li^+$ ions in the NASICON-type phase via chemical or electrochemical ion exchange without altering the rhombohedral lattice structure, thereby preparing the solid electrolyte.

A catholyte composition is also provided. The catholyte composition comprises the super ion conductor composition, where M is Mn such that the super ion conductor composition has the formula $A_{1+x}Mn_{x/2}Zr_{2-x/2}(PO_4)_3$, where each A and subscript x are as defined above.

An ion conducting solid electrolyte membrane is further provided. The ion conducting solid electrolyte membrane comprises the super ion conductor composition where M is Mg such that the super ion conductor composition has the formula $A_{1+x}Mg_{x/2}Zr_{2-x/2}(PO_4)_3$, where each A and subscript x are as defined above.

These and other features and advantages of the present invention will become apparent from the following description of the invention, when viewed in accordance with the accompanying examples and the appended claims.

DETAILED DESCRIPTION

A super ion conductor composition (the "composition") is provided. As described herein, the composition is a sodium superionic conductor (i.e., "NASICON") type material compatible with both sodium and lithium ions, i.e., interchangeably from a conserved material structure. As such, the composition provides a sodium-based NASICON-type phase that can be used as both sodium and lithium ion conductors, thus enabling a broad range of electrolyte materials, e.g. by allowing for the combination of Na-based solid electrolytes with Li-ion sources and sinks. Importantly, the composition, and the related preparation method described further below, represent a significant advancement over convention Li-based NASICONs with similar composition and lattice structures. While such conventional materials are limited in achievable lithium content and require high-energy/temperature synthesis conditions, the present embodiments provide for increased Li-content, and thus higher intrinsic ionic conductivities, via a lower-temperature synthetic route. As such, the present embodiments provide an accessible route to new dual-ion super ionic conductor materials, and enable a wide-range of Na-based NASICON stoichiometries for Li-metal solid state batteries that are not directly accessible in conventional Li-based NASICONs.

The composition has the general formula:

$$A_{1+x}M_{x/2}Zr_{2-x/2}(PO_4)_3,$$

wherein each A is independently Na or Li, M is Mn or Mg, and subscript x is from 0.5 to 3. As such, the composition comprises a metallic zirconium phosphate compound. The particular variables and variations of the general formula and compound(s) represented thereby are described in turn below, and will be best understood by those of skill in the art in view of the exemplary methods and materials related to the preparation of the composition provided herein.

It will be appreciated in views of the general formula that the composition may comprise an NMZP-type material, i.e., based on the designations of Na, Mn, Zr, and the phosphate in the formula shown. However, for clarity, and ease of reference herein, the terms NMnZP-type and NMgZP-type will be used to refer to the manganese and magnesium versions of the inventive materials, respectively.

In certain embodiments, for example, M is manganese (Mn) and the composition may be further defined as a NMnZP-type material having the general formula:

$$A_{1+x}Mn_{x/2}Zr_{2-x/2}(PO_4)_3,$$

where each A is independently Na or Li, and subscript x is from 0.5 to 3. For example, in some such embodiments, each A is Na and the NMnZP-type material has the formula $Na_{1+x}Mn_{x/2}Zr_{2-x/2}(PO_4)_3$. In other such embodiments, each A is Li and the NMnZP-type material has the formula $Li_{1+x}Mn_{x/2}Zr_{2-x/2}(PO_4)_3$. In certain embodiments, however, each A is independently selected such that the NMnZP-type material comprises both Na-ions and Li-ions, and may thus be represented by the formula $(Li/Na)_{1+x}Mn_{x/2}Zr_{2-x/2}(PO_4)_3$, where the proportion of Na-ions to Li ions is not particularly limited and may be selected by one of skill in the art, e.g. by implementing the preparation method described herein.

In some embodiments, M is magnesium (Mg) and the composition may be further defined as a NMgZP-type material having the general formula:

$$A_{1+x}Mg_{x/2}Zr_{2-x/2}(PO_4)_3,$$

where each A is independently Na or Li, and subscript x is from 0.5 to 3. For example, in some such embodiments, each A is Na and the NMgZP-type material has the formula $Na_{1+x}Mg_{x/2}Zr_{2-x/2}(PO_4)_3$. In other such embodiments, each A is Li and the NMgZP-type material has the formula $Li_{1+x}Mn_{x/2}Zr_{2-x/2}(PO_4)_3$. In further embodiments, however, each A is independently selected such that the NMgZP-type material comprises both Na-ions and Li-ions, and may thus be represented by the formula $(Li/Na)_{1+x}Mg_{x/2}Zr_{2-x/2}(PO_4)_3$, where the proportion of Na-ions to Li ions is not particularly limited and may be selected by one of skill in the art as described herein.

As introduced above, subscript x is selected from values of from 0.5 to 3. The selection of subscript x may vary, e.g. depending on the particular metal (e.g. M) and/or cation (e.g. N) utilized in the preparation. For example, in certain embodiments, subscript x is from 1 to 3, alternatively from 1.5 to 3, alternatively from 1.5 to 2. In other embodiments, subscript x is from 0.5 to 2, alternatively from 0.5 to 0.5 to 1.5, alternatively of from 0.5 to 1. It will be appreciated that various selections of subscript x may be utilized, as impacted by the stoichiometric utilized to prepare the composition, which is described and illustrated in the example below. In some embodiments, subscript x is selected from 0.5, 1, 1.5, and 2.

It will be appreciated that the variables in the general formula above will influence the properties of the composition. In general, the composition comprises a rhombohedral lattice structure that allows for rapid mobile Na—Li ion-exchange (e.g. via movement between interstitial sites in the crystal structure of the materials) when electrochemically cycled, as demonstrated in the examples herein. As such, it is believed that performance of the composition and materials comprising the same may be increased or tailored by altering the size of the "bottlenecks" between polyhedra in the crystal structure of the composition. These bottlenecks may be modified (i.e., in terms of size, regularity, etc.) based on the components utilized in the preparation of the composition in order to alter the ionic conductivity of the composition. Moreover, the ionic conductivity of the composition may be improved by tuning the concentration of mobile ions (e.g. Na, Li) therein. As such, selection of variables in the general formula above may be used to provide the composition with unique properties.

For example, in some embodiments, A is Na and the super ion conductor composition comprises a rhombohedral lattice structure. In some such embodiments, the composition typically exhibits an activation energy of from 0.1 to 0.12 eV. In such embodiments, composition also typically exhibits a room temperature conductivity of at least $1.54 \times 10^{-5}$ S cm$^{-1}$ for a Mn-based phase and $5 \times 10^{-4}$ S Cm$^{-1}$ for a Mg-based phase. For example, in some such embodiments, subscript x is 0.5 and the composition exhibits a room temperature conductivity of at least $1.54 \times 10^{-5}$ S cm$^{-1}$ for the Mn-based phase and $5 \times 10^{-5}$ S Cm$^{-1}$ for the Mg-based phase. In other such embodiments, subscript x is at least 1.5 and the composition exhibits a room temperature conductivity of at least $2.82 \times 10^{-5}$ S cm$^{-1}$ for the Mn-based phase and $1.5 \times 10^{-4}$ S cm$^{-1}$ for the Mg-based phase. In specific such embodiments, subscript x is 1.5 and composition exhibits a room temperature conductivity of at least $2.86 \times 10^{-5}$ S cm$^{-1}$ for the Mn-based phase and $1.52 \times 10^{-4}$ S cm$^{-1}$ for the Mg-based phase. In particular embodiments, subscript x is 1.5 and composition exhibits a room temperature lithium ion conductivity of at least $5 \times 10^{-3}$ S cm$^{-1}$ for the Mn-based phase and $6 \times 10^{-3}$ S cm$^{-1}$ for the Mg-based phase.

Additional properties and performance characteristics of the composition may also be determined and improved by selection of the constituent parts (i.e., via selection of the variables in the general formula above). For example, among the preceding embodiments, the composition may exhibit a critical current density against both Na and Li metals up to currents of 0.32 mA cm$^{-2}$ (e.g. when used with a plate thickness of 0.66 mm or scaled equivalent).

In specific embodiments, A is sodium, M is Mg, and subscript x is 0.5. In such embodiments, the composition has the general formula $Na_{1.5}Mg_{0.25}Zr_{0.75}(PO_4)_3$. In other similar embodiments, x is 1.5, and the composition has the general formula $Na2.5Mg_{0.75}Zr_{0.25}(PO_4)_3$. As the manganese metal is used stoichiometrically in the same fashion as the magnesium metal above, illustration of the various values of subscript x will be understood to be generally applicable to both Mn and Mg species of compositions.

As will be understood in view of the examples herein, the composition is suitable for use in or as a solid electrolyte or solid electrolyte material. For example, in certain embodiments, the composition is the NMnZP-type material set forth above. In such embodiments, the composition may be used as an additive in a catholyte composition, e.g. to enhance ionic and electronic transport of catholyte therein. In other embodiments, the composition is the NMgZP-type material set forth above. In such embodiments, the composition may be employed as an ion conducting solid electrolyte membrane. It will be appreciated that in any of the preceding embodiments, various final forms of the composition may be utilized independently or together (i.e., in combination) in a solid-state battery.

For example, the composition may be utilized in a solid-state battery, such as an all-solid-state battery, which is also provided for in the present embodiments and examples herein. The all-solid-state battery may be an all-solid-state sodium-ion battery, an all-solid-state lithium-ion battery, or an all-solid-state hybrid lithium-sodium-ion battery.

A method of preparing the composition (the "preparation method") is also provided. It will be appreciated that the composition itself can be used as, or in (e.g. as a component of) different forms of conductive materials. For example, the composition may be used as a solid electrolyte. Alternatively, the composition may be used as a component of a solid electrode, or as a precursor for preparing a solid electrolyte composition or solid electrode. In any of these cases, the preparation method does not substantially change, as will be understood by those of skill in the art.

Typically, the preparation method proceeds via a sol-gel process, i.e., by formation of a colloidal solution/mixture of components in a carrier, removing the carrier after formation, and processing the resulting structure (e.g. via heating/calcining/sintering, etc.). The particular details and salient parameters of these processes, techniques, and features of the preparation method are described in detail below. As demonstrated herein, the particular process of the preparation method prepares the composition as a dual Li/Na ion conductor comprising a rhombohedral lattice structure and mobile Na$^+$ and Li$^+$ ions, or Na$^+$ ions capable of rapid exchange with Li$^+$ ions.

In general, the method comprises combining together a zirconium compound, a sodium compound, a phosphate compound, and a manganese or magnesium compound (collectively, the "compounds" or "components") to give a mixture, and subsequently calcining the mixture to give a NASICON-type phase comprising mobile Na$^+$ ions. The method may also comprise substituting at least some of the mobile Na$^+$ ions with Li$^+$ ions in the NASICON-type phase (i.e., post-calcination/structural formation) via chemical or electrochemical ion exchange to give the super ion conductor composition without substantially altering, alternatively without altering, the rhombohedral lattice structure. As the composition so prepared may be used directly as a solid electrolyte, the method may be used to prepare a solid electrolyte comprising the composition.

One of skill in the art will appreciate that various forms the compounds/components may be available, e.g. such as specific hydrated forms thereof, and selections will be made in view of the entire mixture being prepared and that particular process being utilized.

With regard to the individual components, examples of suitable zirconium compounds include zirconyl chloride ($ZrOCL_2$), zirconium(IV) oxynitrate ($ZrO(NO_3)_2$), zirconium(IV) sulfate ($Zr(SO_4)_2$), zirconium dioxide ($ZrO_2$), and combinations thereof. In specific embodiments, the zirconium compound is zirconyl chloride ($ZrOCL_2$).

Examples of suitable sodium compounds include sodium hydroxide (NaOH), sodium carbonate ($Na_2CO_3$), sodium chloride (NaCl), sodium oxide ($Na_2O$), sodium acetate ($C_2H_3NaO_2$), trisodium citrate ($Na_3C_6H_5O_7$), sodium oxalate ($Na_2C_2O_4$), and combinations thereof. In specific embodiments, the sodium compound is sodium carbonate ($Na_2CO_3$)

Examples of suitable phosphate compounds include ammonium dihydrogen phosphate ($NH_4H_2PO_4$), diammonium phosphate (($NH_4)_2HPO_4$), phosphoric acid ($H_3PO_4$), phosphorous acid ($H_3PO_3$), and combinations thereof. In specific embodiments, the phosphate compound is diammonium phosphate (($NH_4)_2HPO_4$).

The manganese or magnesium compound will vary depending on the type and nature of the composition being prepared, i.e., whether a NMnZP-type or NMgZP-type super ionic conductive composition is desired. In some embodiments, a manganese compound is utilized, and the composition is prepared as a NMnZP-type super ionic conductive composition. Examples of suitable manganese compounds include manganese(II) nitrate ($Mn(NO_3)_2$), manganese(II) chloride ($MnCl_2$), manganese(II) sulfate ($MnSO_4$), manganese(II) carbonate ($MnCO_3$), and combinations thereof. In specific embodiments, the manganese compound is manganese(II) nitrate ($Mn(NO_3)_2$).

In some embodiments, a magnesium compound is utilized, and the composition is prepared as a NMgZP-type super ionic conductive composition. Examples of suitable magnesium compounds include magnesium nitrate ($Mg(NO_3)_2$), magnesium chloride ($MgCl_2$), magnesium sulfate ($MgSO_4$), and/or magnesium carbonate ($MgCO_3$). In specific embodiments, the magnesium compound is magnesium nitrate ($Mg(NO_3)_2$).

With regard to the components above, it will be appreciated that other particular compounds may be utilized in place of or in addition to those listed. However, the components will each provide a source of their respective element (i.e., suitable phosphate compounds will provide a source of phosphate ions/groups) that is available for integration into the structure of the composition as described and exemplified herein.

Typically, the components are combined in the presence of a carrier (i.e., a solvent), such as water. For example, in particular embodiments, the magnesium or manganese compound is combined with water (i.e., a carrier) to make a first pre-mixture, the zirconium compound is combined with water to prepare a second pre-mixture, and the sodium compound and phosphate compound are combined together in the presence of water to give a third pre-mixture. In such embodiments, the first and second pre-mixtures may be combined together to prepare a master pre-mixture, to which the third pre-mixture may be added (e.g. dropwise with stirring). Such pre-mixtures will be best understood in view of the procedures exemplified herein, and may be performed in different orders of addition.

Once the pre-mixtures are combined to give the mixture of all components, the preparation method typically includes removing the carrier from the mixture, e.g. via heat, reduced pressure, etc., to give a dry mixture. For example, in some embodiments, the mixture is stirred at an elevated temperature (e.g. from 70 to 90, alternatively 80° C.) for a time (e.g. from 6 to 24, such as from 8 to 16, alternatively of 12 h) to evaporate the solvent from the mixture. A heating mantle, hot bath, or hot plate may be utilized for this step, e.g. depending on size. The dry mixture may present as a powder or other particulate solid, depending on the particular components utilized in the preparation method.

It will be appreciated that other solvents may be utilized in addition to, or in place of, water, including polar protic and aprotic solvents capable of dissolving the components being utilized without hindering the formation of the composition. For example, methanol, ethanol, acetone, etc. may be used. Typically, carriers/solvents will be selected on the basis of compatibility with the components and ease of removal after formation of the mixture, although other considerations such as toxicity and availability may be utilized to select an appropriate carrier for use in the preparation method.

Once the carrier has been removed, the resulting dry mixture is typically heated (e.g. calcined) to burn of residual volatiles, and then ground to a desired size and, optionally, pressed into a tablet or pellet form. Specifically, the preparation method typically includes calcining (i.e., burning/heating) the powder obtained upon removing the carrier from the component mixture. The calcining is not particularly limited, and may be carried out at by any known technique/process known in the art. For example, in some embodiments the preparation method comprises disposing the mixture into an alumina crucible, and heating the alumina crucible to 400° C. for 12 hours to burn off volatiles. In these or other embodiments, calcining comprises grinding and re-heating a calcined powder obtained in the first calcination process. For example, in some embodiments, a pre-calcined powder is ground and re-calcined at 650° C. for 48 hours (e.g. while open to air) to give a final solid composition, which may then be sized (e.g. via milling, grinding, etc.) and, optionally, pressed into pellets or other stable forms for later use. For example, in some embodiments, the final solid composition is ground via mortar and pestle to a fine powder, which is then formed into half-inch pellet roughs that are pressed at a pressure of 400 MPa in a uniaxial hydraulic press to give the composition in the form of discreet pellets (i.e., green pellets). The green pellets may then be further processed, e.g. via heating, shaping, forming, etc. For example, in some embodiments the green pellets are sintered at 750° C. for 48 hours in a muffle furnace to give sintered pellets, which are then polished to a mirror finish to give the composition as polished pellets suitable for use without further processing.

Notably, the temperature for the calcining, re-calcining, and sintering set forth above may differ from the exemplary values given. For example, the calcining may be carried out at a temperature of from 350 to 450, alternatively from 375 to 425° C. Likewise, the re-calcination may be carried out at a temperature of from 600 to 700, alternatively from 625 to 675° C., and the sintering may be carried out at a temperature of from 700 to 800, alternatively from 725 to 775° C. Temperatures outside these ranges may be utilized as well, as will be understood by those of skill in the art. However, it will be appreciated that additional time may be needed for these operations when lower temperatures are selected, and incomplete processing may result from too low a temperature being selected, which can be determined using the characterization methods exemplified herein. Similarly, higher temperatures than those listed may be utilized. However, an advantage of the components and steps of the preparation method is that higher synthesis temperatures (e.g. ~900-1100° C.) required for conventional direct synthesis of Li-based NASICON compositions with rhombohedral symmetry are not required in the preparation method. Rather, as provided in the examples below, the present embodiments provide for electrochemical ion exchange from Na to Li, which is not limited in achievable Li-content as the direct synthesis methods are.

The following examples, illustrating embodiments of this disclosure, are intended to illustrate and not to limit the invention. Unless otherwise noted, all reactions are carried out under air, and all materials, substrates, and reagents are purchased or otherwise obtained from various commercial suppliers and utilized as received.

In the examples below, NASICON-type materials comprising $A_{1+x}M_{x/2}Zr_{2-x/2}(PO_4)_3$, compositions, where A is Na or Li, M is Mn or Mg, and subscript x is from 0.5 to 3, are prepared and evaluated for ion interchangeability of electrolytes and enable broader electrolyte material families by combining Na-based solid electrolyte with Li-ion sources and sinks.

As will be understood in view of the particular examples below, higher sodium-containing NASICON-type phases are successfully prepared via sol-gel process followed by heat treatment at 650° C. to form a ceramic body. The mobile sodium ion of the synthesized solid electrolyte is substituted partially by a lithium ion, either by electrochemical or chemical methods. The exchange process results in a lithium-based NASICON-type phase that keeps its crystal structure unaltered throughout. The solid electrolyte can conduct sodium ions or lithium ions depending on the type of electrode materials that are coupled thereto, and exhibits higher lithium ion conductivity, as well as reduced ion migration energy (i.e., activation energy), than conventional materials.

Symmetrical cell configurations Na/SE/Na and Li/SE/Li are employed to measure the sodium and lithium stripingplating behavior and ionic conductivity of the compositions prepared. As shown, the present lithium-based NASICON-type materials exhibit better ionic conductivity than material synthesized by conventional processes. Moreover, ion conductivity of the present sodium-based electrolytes can be converted into hybrid lithium-sodium ion conductors in an all solid-state battery.

Material Synthesis $Na_{1+x}Mn_{x/2}Zr_{1-x/2}(PO_4)_3$ (NMnZP) was synthesized using sol-gel method from stoichiometric mixtures of $ZrOCl_2 \cdot 6H_2O$ (Aldrich), $Mn(NO_3)_2 \cdot 4H_2O$ (Aldrich), $Na_2CO_3$ (Aldrich), and $(NH_4)_2HPO_4$ (Aldrich, 99.99%). Phases where subscript x=0.5, 1, 1.5, and 2, were prepared and analyzed in particular. First $ZrOCl_2 \cdot 6H_2O$ and $Mn(NO_3)_2 \cdot 4H_2O$ were dissolved in deionized water sequentially. $Na_2CO_3$ and $(NH_4)_2HPO_4$ precursors were dissolved in DI water separately (50 ml of water for each). The mixture of $Na_2CO_3$ and $(NH_4)_2HPO_4$ solutions were added dropwise to the $ZrOCl_2 \cdot 6H_2O$ and $Mn(NO_3)_2 \cdot 4H_2O$ solution under continuous stirring. The solution was stirred on a hot plate at 80° C. for 12 h to evaporate the solvent. The resulting powder was ground and heated in alumina crucible at 400° C. for 12 h in air to burn off the volatile species. The calcined powder was ground and re-calcined at 650° C. for 48 h in air to obtain final phase. The resultant material was mortar-pestled to a fine powder and used for making pellets. ½" pellets were pressed at a pressure of 400 MPa in a uniaxial hydraulic press. The green pellets were sintered at 750° C. for 48 hours in a muffle furnace. The sintered pellets were polished to a mirror finish. The resultant thickness of the pellets were 600 μm. The pellets were used for further studies without any modifications.

$Na_{1+x}Mg_{x/22}Zr_{1-x/2}(PO_4)_3$ (NMgZP) was synthesized according to the procedure above using $Mg(NO_3)_2$ in place of the $Mn(NO_3)_2$ component. Phases where subscript x=0, 0.5, 1, 1.5, 2, and 2.5 were prepared and analyzed in particular. The resulting material was dried at 100° C. For ionic conductivity measurements, sintering was performed at 800° C. for 12 h in air. Relative density was above 95%.

Electrochemical Measurements

Gold blocking electrodes were sputtered on the pellet surface for ionic conductivity measurements (Cressington Sputter Coater). Ionic conductivity was measured using impedance spectroscopy (Biologic, VSP 128) from 20° C. to 70° C. for all compositions using sputtered Au-electrodes. EIS was carried out with a frequency range of 0.5 MHz to 1 Hz with an AC amplitude of 10 mV. The resultant impedance spectra were fitted by an equivalent circuit model in Zview software to estimate the total ionic conductivity. Symmetric Li|NMZP|Li and Na|NMZP|Na cells were assembled in swagelok type cells. 8 mm Li and Na foils were punched and used as the electrodes. Galvanostatic charge-discharge stability tests for Na |NMZP|Na symmetric cells were carried out at a current density of 20, 40 and 80 μA cm$^{-2}$ with a period of 30 minutes for plating and stripping at 70° C. For Li|NMZP|Li, it was kept as 40, 60 and 80 μA cm$^{-2}$ with the same period for plating and stripping at 70° C.

Material Characterization

The composition of synthesized powder was determined by inductively coupled plasma optical emission spectrometer (ICP-OES, Agilent Technologies 5110). The samples were digested in an HF solution and then diluted in 2 wt % HNO3 for ICP measurement. Morphological characterization of the pristine powder, sintered pellet as well as the cycled lithium foils was carried out using scanning electron microscope (Zeiss Merlin system). Energy dispersive spectroscopy of the samples was additionally carried out at a 20 kV beam energy. The results of the ICP-OES evaluations are shown in Table 1 below.

TABLE 1

Atomic Concentration of NMZP Compositions Estimated from ICP-OES

| NMZP | Na | Mn | Zr | P |
|---|---|---|---|---|
| x = 0.5 | 1.51 | 0.25 | 1.70 | 3.00 |
| x = 1.0 | 2.00 | 0.53 | 1.47 | 3.00 |
| x = 1.5 | 2.49 | 0.75 | 1.24 | 3.00 |
| x = 2.0 | 3.10 | 1.03 | 0.97 | 3.00 |

Powder Neutron Diffraction was performed on the NASICON-type powders using POWGEN at the Spallation Neutron Source at Oak Ridge National Laboratory, Oak Ridge, TN, USA. Each powder sample (1-2 g) was loaded into 6 mm vanadium cans which were then sealed in a ventilated hood. The scan time for each sample was set at four hours. The data collection was performed using a center wavelength of 0.8 Å with a bandwidth of about 1 Å. The obtained diffraction data were normalized against a vanadium rod and was calibrated using a powder diamond standard. Standard NIST Si 640d was used as external calibrants for the instrument. Time-of-flight (TOF) data were converted to d-spacing data using the modified second order polynomial TOF=ZERO+DIFC*d+DIFA*d2+DIFB/d, where ZERO is a constant, DIFC is the diffractometer constant, DIFA and DIFB are empirical terms to correct the sample displacement and absorption caused peak shift. During the refinement (using TOPAS software version 6), ZERO and DIFC were determined from the refinement using a standard NIST Si 640d, while DIFA and DIFB were allowed to vary to account for the sample displacements/absorption. A back to back exponential function convoluted with symmetrical pseudo Voigt function were used to describe the peak profile. The results of the Powder Neutron Diffraction evaluations for $Na_{1+x}Mn_{x/2}Zr_{2-x/2}(PO_4)_3$ are shown in Table 2 below.

TABLE 2

[Na—O] Bond Lengths in M1 and M2 Sites Estimated from the Refinement of Neutron Scattering Data for $Na_{1+x}Mn_{x/2}Zr_{2-x/2}(PO_4)_3$

| NMZP | [Na—O] at M1 | [Na—O] at M2 |
|---|---|---|
| x = 0.5 | 6 × Na*—O = 2.56 Å | 2 × Na‡—O = 2.386 Å |
|  |  | 2 × Na‡—O = 2.528 Å |
|  |  | 2 × Na‡—O = 2.778 Å |
|  |  | 2 × Na‡—O = 2.895 Å |
| x = 1.0 | 6 × Na*—O = 2.585 Å | 2 × Na‡—O = 2.400 Å |
|  |  | 2 × Na‡—O = 2.546 Å |
|  |  | 2 × Na‡—O = 2.772 Å |
|  |  | 2 × Na‡—O = 2.784 Å |
| x = 1.5 | 6 × Na*—O = 2.580 Å | 2 × Na‡—O = 2.449 Å |
|  |  | 2 × Na‡—O = 2.560 Å |
|  |  | 2 × Na‡—O = 2.747 Å |
|  |  | 2 × Na‡—O = 2.877 Å |
| x = 2.0 | 6 × Na*—O = 2.583 Å | 2 × Na‡—O = 2.487 Å |
|  |  | 2 × Na‡—O = 2.531 Å |
|  |  | 2 × Na‡—O = 2.729 Å |
|  |  | 2 × Na‡—O = 2.918 Å |

X-Ray photoelectron spectroscopy was carried out on the cycled pellet as well as lithium foil. A cycled cell was disassembled inside the glove box and Li-foils were carefully delaminated from both sides of the pellet. Li foil samples were examined after each was broken into two parts to analyze both sides of each sample. Care was taken to minimize the air exposure of the samples by transferring the samples using appropriate atmosphere control sample holders. Two line scans were made roughly perpendicular to each other. At each point (8 points in all) a wide energy range survey scan was collected to determine all elements present. The amount of Na at each of the 8 analysis points was determined to see if any "hot spots" were apparent. Places that showed above trace levels of Na were used to determine where to set of a rectangular grid of points to make a "Na map". After the maps were acquired, two points were selected on each map: one at the highest point of Na and one at an area of low Na. Narrow energy range core level data were acquired at the high and low points. The results of the X-Ray photoelectron spectroscopy evaluations for $Na_{1+x}Mn_{x/2}Zr_{2-x/2}(PO_4)_3$ are shown in Table 3 below.

TABLE 3

Atomic percentage evaluation of various elements present on side 1 of cycled and delaminated Li foil with XPS for $Na_{1+x}Mn_{x/2}Zr_{2-x/2}(PO_4)_3$

| XPS location | Li | Na | O | C |
|---|---|---|---|---|
| L1-P1 | 25.3 | 0.21 | 32.5 | 41.5 |
| L1-P2 | 22.8 | 0.15 | 30.8 | 45.7 |
| L1-P3 | 25.2 | 0.15 | 34.3 | 39.9 |
| L1-P4 | 25.5 | 0.83 | 35.8 | 37.2 |
| L1-P5 | 24.7 | 2.07 | 39.2 | 33.6 |
| L2-P1 | 25.3 | 0.04 | 35.1 | 38.9 |
| L2-P2 | 25.4 | 0.05 | 33.8 | 39.5 |
| L2-P3 | 24.1 | 0.15 | 33.9 | 41.2 |

For the pellet, data were acquired on the as received surface (survey scan and core level spectra), then a depth profile was done for a total of 20 minutes of Ar-ion etching, and then survey and core level spectra were acquired on the well etched surface. The calibrated sputter rate for the ion gun was ~12 nm/min, based on standard $SiO_2$ films. If the pellets sputtered at the same rate, 20 min of etching would have removed ~230 nm of material.

Description of Experimental Results and Examples

NMnZP compositions were synthesized with compositions varying from x=0.5 to x=2. NMgZP compositions were synthesized with compositions varying from x=0 to x=2.5. Various compositions were characterized using neutron diffraction and impedance measurement to understand and analyze the mechanism of ionic conduction and identify optimized Na concentration to achieve highest possible conductivity from this structure.

The material ability to conduct Li and Na ions was shown using plating and stripping experiments performed with symmetric Li|NMnZP|Li and Na|NMnZP|Na cells. Confirmation of Li—Na interchange in these materials was achieved using post-mortem analysis using SEM and XPS techniques on cycled electrolyte and Li electrode. This demonstrated dual (Li/Na) ion conducting nature of the present NASICON-type materials Stoichiometry variations in crystal structure modify the ion transport kinetics through the material. Neutron diffraction showed that all NMnZP compositions crystallize in $R\bar{3}C$ structure, SEM micrography showed a well-sintered surface of the pellet surface, indicating high density. Elemental composition of the synthesized NMnZPs was verified by inductively couple plasma optical emission spectroscopy (ICP-OES) measurements, shown in Table 1 above, which suggest that calculated molar ratios were achieved.

The structure is based on a three dimensional framework of $[PO_4]$ tetrahedra and $[(Zr/Mn)O_6]$ octahedra sharing corners. $Zr^{4+}$ and $Mn^{2+}$ were identified to share a statistically distributed 12c sites based on the structural refinement and crystal structure information. Detailed structural and refinement information is provided in Table 2 above. The average $[(Zr/Mn)—O]$ bond length in $[(Zr/Mn)O_6]$ octahedra monotonically increased from 2.065(3) Å in $Na_{1.5}Mn_{0.25}Zr_{1.75}(PO_4)_3$ to 2.107(13) Å in $Na_3MnZr(PO_4)_3$. Increasing Na+ in the structure increases the repulsion between $Na^+$ and $Zr^{4+}/Mn^{2+}$ atoms, which elongates the average $[(Zr/Mn)—O]$ bond lengths in the adjacent octahedra without changing the structural symmetry. Higher spin radius of $Mn^{2+}$ compared with $Zr^{4+}$ presents longer bond length in octahedral sites resulting in a gradual increase of $[(Zr/Mn)—O]$ bond lengths from x=0.5 to x=2. The average $[P—O]$ bond length values (1.524(14) Å) are close to those typically found in NASICON-like phosphates in $Na_3MZr(PO_4)_3$. $Na^+$ cations partially occupy two different M1 and M2 sites. $Na^+$ cations are surrounded by 6 and 8 $O^-$ anions in M1 and M2 sites, respectively. Na1 occupying M1 site sits in the center of 6 $O^-$ anions, so the bond length of Na–O is constant throughout the structure for all compositions, as shown in Table 3 above.

$Na^+$ occupying M2 sites is slightly off-center and thus the bond length varies in the structure as well as for different NMnZP compositions. Na—O bond length varied from 2.487(4) Å to 2.918(3) Å in $Na_3MnZr(PO_4)_3$. [Na—O] bond length in M2 site increased concurrently with sodium concentration in NMnZP. Increasing the Na content in the NMnZP structure from x=0.5 to x=2 increased the sodium content in the M2 site and stayed roughly constant in M1 site. [Na—O] bond length and Na cation occupancy in the M2 site have a direct impact on the ionic movement and kinetic energy and hence on the overall conductivity of the material.

Room-temperature conductivity increased from $1.54 \times 10^{-5}$ S cm$^{-1}$ for NMnZP05 to $2.82 \times 10^{-5}$ S cm$^{-1}$ for NMnZP20. NMnZP15 and NMZP20 showed similar room-temperature conductivity. The activation energy for all the materials were equivalent (~0.1-0.12 eV). The increased ionic conductivity at a similar activation energy suggests that the ion transport mechanism for all the materials is identical and the increase arises from the higher concentration of mobile charge carriers.

Diffraction results indicated an increment of mobile $Na^+$ cations in M2 site with increasing sodium concentration. It should be noted that $Na^+$ cations in M1 site help maintain the structure skeleton and do not contribute to ion conduction. Increasing sodium content also increased the [Na—O] bond length in M2 site which increased the mobility of these ions resulting in higher overall ionic conductivity. The site occupancy of $Na^+$ cations and [Na—O] bond length in mobile M2 site increased monotonically with x in NMnZP. However overall conductivity plateaued at sodium concentration of x=1.5. This phenomenon can be described by the vacancy-charge carrier imbalance. The limitation of available vacancy for ion transport in NMnZP20 compared to NMnZP15 suppresses the increase of overall conductivity in spite of higher concentration of mobile charge carriers. $Na_{2.5}Mn_{0.75}Zr_{1.25}(PO_4)_3$ was used for further electrochemical performance analysis as a Li and Na ion conductor as it showed the highest conductivity. Impedance spectra provided information regarding the grain level ion transport mechanisms. Two semicircles in the impedance spectra indicated grain and grain boundary components at higher and lower frequencies, respectively. These semicircles were followed by a Warburg element which indicated that the physical processes occurring at low frequencies are predominantly charge-transfer and semi-infinite diffusion of $Na^+$ in Au. Ion exchange of the mobile $Na^+$ ion in the rhombohedral matrix with $Li^+$ ions enabled a dual ion transport capability. This allowed a native Na-matrix to transport $Li^+$ by replacing the $Na^+$ ions from the matrix chemically or electrochemically with an external reservoir of Li ions. As far as the authors know, this is the first report of its kind showcasing this ion transport mechanism.

Galvanostatic plating and stripping was carried out on Na|NMnZP|Na symmetric cell at three different current densities: 20, 40, and 80 $\mu$A cm$^{-2}$ at 70° C. for the Na—Na symmetric cell. Overpotential for 20 $\mu$A cm$^{-2}$ was 0.25 V, 40 $\mu$A cm$^{-2}$ was 0.533 V and 80 $\mu$A cm$^{-2}$ was 1.106 V. The overpotentials showed smooth profiles indicating planar stripping and deposition surface. Galvanostatic plating and stripping was also carried out on Li|NMnZP|Li symmetric cell at three different current densities: 40, 60, and 80 μA cm² at 70° C. The cell showed uniform plating and stripping overpotential profiles, indicating a lower barrier to ion exchange over the studied current densities. Overpotential values for 40 μA cm⁻² is 0.39 V, 60 μA cm⁻² is 0.55 V and 80 μA cm⁻² is 0.777 V. The overpotential increased by <10 mV at lower current densities of 40 and 60 μA cm⁻² over 50 cycles. This indicated an absence of detrimental interfacial reactions. However, at 80 μA cm⁻², the overpotential increased gradually until failure because of the cutoff at potentiostat limits. The gradual increase in overpotential at higher current densities is likely due to the decreased electrode|electrolyte contact at the interface of Li and NMnZP arising from mass transport limitations. It should be noted that these measurements are carried out in the absence of stack pressure, which is generally significant (3-10 MPa) for the measurements reported with other ceramic electrolytes. It is understood that optimization of the operating and testing protocols for NMnZP symmetric cell will significantly improve the critical current density of this material.

The stable cycling in a Li|NMnZP|Li configuration delineates several ion-conduction mechanisms. For example, the mobile Na+ cations could be moving inside the structure and the Li electrodes merely serve as current collectors to provide a potential difference. Alternatively, Na+ might be pushed out of the structure in the first few cycles, and $Li^+$ can move into the structure in subsequent cycles utilizing the same M2 site as Na. The latter alternative is possible since $Li^+$ ionic radii (76 pm) is smaller than $Na^+$ cation (102 pm), which can also improve overall bulk conductivity of the system since the smaller $Li^+$ would have higher mobility in the Na− structure.

Post-mortem analysis was carried out with SEM and XPS on Li foil and cycled pellets to assess the cationic electrochemical exchange mechanism. Disassembled Li foil was analyzed at two interfaces: (i) electrode|electrolyte interface (side 1) and (ii) electrode|current collector interface (side 2). SEM image of side 1 shows globular deposits on the plating surface, which are not observed on the side facing the current collector. EDS mapping of side 1 showed the presence of Na deposits on the surface. This Na metal was deposited on the Li foil due to electrochemical ion exchange of Na from the NMnZP matrix by Li. The presence of N and C can be explained by $Li_2CO_3$ and $LiNO_3$ impurities generated by air leaking in the cell or the sample holder. The important take-away here was that the Na metal was observed on the Li foil.

XPS characterization was carried out over multiple locations across a large Li foil area to confirm that Na metal was electrochemically deposited on the Li foil and not an artifact from cell disassembly. Surface concentration profiles were mapped across two nearly perpendicular lines on a cycled Li foil on the interface that was in contact with NMnZP The presence of Na is peak was observed at all the locations with the surface atomic concentration for Na ranging from 2.07 to 0.05 at. %, as shown in Table 3 above.

In a single plating/stripping step, 0.04 mAh of charge was cycled at 80 μA cm⁻², and a total of 6.6 mAh of charge was cycled through the electrolyte. This corresponded to approximately 2.97 μmol cm⁻² of Na cycling in each half-cycle and 0.4 mmol cm⁻² total molar flux. In comparison, the pristine lithium electrode corresponded to roughly 4 mmol cm⁻² of Li. The plated molar flux was significantly lower than the pristine lithium surface concentration. This confirmed that the atomic concentration observed with XPS was an evidence for Na-metal plated from within the NMnZP matrix. The presence of Na content at all locations of the XPS map across the Li foil further confirms the hypothesis of Li ions from the counter electrode exchanging Na-ions within the NMnZP matrix which gets plated out.

XPS depth profiling for the cycled pellet was carried out to further validate the ion exchange within the electrolyte bulk. The predominant elements observed on the surface were Na, Mn, Zr, P, and O. The surface also showed 2.3 at. % of lithium content in addition to the elements of the NMnZP matrix. The key difference with increasing depth from the surface was the slow removal of Na. The Li increased sharply initially and then remained at ~11 at. % throughout the profile. Binding energy plot clearly showed the reduction of the peak intensity of the Na 2s peak after Ar-etching, showing that $Na^+$ cations were removed from the NMnZP matrix. The presence and increase in Li 1s peak with Ar-etching show that $Li^+$ cations have clearly replaced some of the $Na^+$ cations in the structure. XPS depth profile showed that Na and Li atoms can coexist in the structure. This phenomenon had two implications: either all the mobile $Na^+$ cations are replaced with $Li^+$ cations or the ion conduction mechanism is led by both $Li^+$ and $Na^+$ cations concurrently.

As provided above, the compositions enable the potential of a wide family of Na-single-ion conductors to be used in Li-based systems leveraging benefits of both systems.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. The technology disclosed and claimed herein may be available for licensing in specific fields of use by the assignee of record.

The invention claimed is:

1. A super ion conductor composition having the formula:

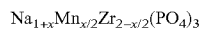

wherein subscript x is 0.5, 1.0, or 1.5.

2. The super ion conductor composition of claim 1, comprising a rhombohedral lattice structure.

3. The super ion conductor composition of claim 2, wherein the super ion conductor composition exhibits: (i) an activation energy of from 0.1 to 0.12 eV; (ii) a room temperature conductivity of at least $1.54 \times 10^{-5}$ S cm⁻¹; (iii) a critical current density against both Na and Li metals up to currents of 0.32 mA cm⁻², when assessed with a plate thickness of 0.66 mm; or (iv) any combination of (i)-(iii).

4. The super ion conductor composition of claim 3, wherein subscript x is 0.5, and the super ion conductor composition exhibits a room temperature conductivity of at least $1.54 \times 10^{-5}$ S cm⁻¹.

5. The super ion conductor composition of claim 3, wherein subscript x is 1.5, 2.5, and the super ion conductor composition exhibits a room temperature conductivity of at least $2.82 \times 10^{-5}$ S cm⁻¹.

6. The super ion conductor composition of claim 5, wherein subscript x is 1.5, and the super ion conductor composition exhibits: (i) a room temperature conductivity of at least $2.86 \times 10^{-5}$ S cm$^{-1}$; (ii) a room temperature lithium ion conductivity of at least $5 \times 10^{-3}$ S cm$^{-1}$; or (iii) both (i) and (ii).

7. A solid electrolyte comprising the super ion conductor composition of claim 1.

8. A method of preparing the solid electrolyte of claim 7, said method comprising: combining a zirconium compound, a sodium compound, and a phosphate compound with a manganese compound to give a mixture; and calcining the mixture to give the super ion conductor composition, thereby preparing the solid electrolyte.

9. The method of claim 8, wherein the zirconium compound, the sodium compound, the phosphate compound, and the manganese compound are combined in the presence of a solvent, and wherein the method further comprises evaporating the solvent after the combination to give the mixture.

10. The method of claim 9, wherein:
(i) the zirconium compound comprises zirconyl chloride ($ZrOCl_2$), zirconium(IV) oxynitrate ($ZrO(NO_3)_2$), zirconium(IV) sulfate ($Zr(SO_4)_2$), and/or zirconium dioxide ($ZrO_2$);
(ii) the sodium compound comprises sodium hydroxide (NaOH), sodium carbonate ($Na_2CO_3$), sodium chloride (NaCl), sodium oxide ($Na_2O$), sodium acetate ($C_2H_3NaO_2$), trisodium citrate ($Na_3C_6H_5O_7$), and/or sodium oxalate ($Na_2C_2O_4$);
(iii) the phosphate compound comprises ammonium dihydrogen phosphate ($NH_4H_2PO_4$), diammonium phosphate (($NH_4)_2HPO_4$), phosphoric acid ($H_3PO_4$), and/or phosphorous acid ($H_3PO_3$);
(iv) the solvent comprises water;
(v) the manganese compound comprises manganese(II) nitrate ($Mn(NO_3)_2$), manganese(II) chloride ($MnCl_2$), manganese(II) sulfate ($MnSO_4$), and/or manganese(II) carbonate ($MnCO_3$); or
(vi) any combination of (i)-(v).

11. The method of claim 9, wherein: (i) the zirconium compound is a zirconyl chloride; (ii) the manganese compound is manganese nitrate; (iii) the sodium compound is sodium carbonate; the phosphate compound is diammonium phosphate; (iv) the solvent is water; or (v) any combination of (i)-(iv).

12. The method of claim 8, wherein calcining the mixture is carried out: (i) at a temperature of 650° C.; (ii) for a duration of from 12 to 48 hours; or (iii) both (i) and (ii).

13. The method of claim 8, wherein the super ion conductor composition is further defined as a dual-Li/Na ion conductor comprising a rhombohedral lattice structure and mobile Na+ and Li+ ions, wherein calcining the mixture prepares a NASICON-type phase comprising the mobile Na+ ions, and wherein the method further comprises substituting the mobile Na+ ions for Li+ ions in the NASICON-type phase via chemical or electrochemical ion exchange without altering the rhombohedral lattice structure, thereby preparing the solid electrolyte.

14. A solid state battery comprising the solid electrolyte of claim 7.

15. The solid state battery of claim 14, further defined as: (i) an all-solid-state sodium-ion battery; or (ii) an all-solid-state hybrid lithium-sodium-ion battery.

16. A catholyte composition comprising the super ion conductor composition of claim 1.

* * * * *